(12) United States Patent
Haberkamp et al.

(10) Patent No.: US 7,648,546 B2
(45) Date of Patent: Jan. 19, 2010

(54) FILTER WITH VARIABLE PLEAT DEPTH

(75) Inventors: William C. Haberkamp, Cookeville, TN (US); Jerald J. Moy, Oregon, WI (US); Eric A. Janikowski, Jefferson, WI (US); Mark A. Terres, Stoughton, WI (US); Scott P. Heckel, Stoughton, WI (US)

(73) Assignee: Cummins Filtration IP Inc., Minneapolis, MN (US)

(*) Notice: Subject to any disclaimer, the term of this patent is extended or adjusted under 35 U.S.C. 154(b) by 537 days.

(21) Appl. No.: 11/327,613

(22) Filed: Jan. 6, 2006

(65) Prior Publication Data

US 2007/0157589 A1    Jul. 12, 2007

(51) Int. Cl.
*B01D 39/00* (2006.01)
(52) U.S. Cl. .............................. 55/521; 55/497; 55/498; 55/479; 55/529; 210/493.1; 210/493.2; 210/493.4
(58) Field of Classification Search .................. 55/498, 55/482, 484, 521, 529, 479, 497; 210/493.1–493.5
See application file for complete search history.

(56) References Cited

U.S. PATENT DOCUMENTS

| | | | |
|---|---|---|---|
| 4,655,921 A * | 4/1987 | Fujimoto | ..................... 210/489 |
| 4,673,503 A | 6/1987 | Fujimoto | |
| 5,320,657 A | 6/1994 | Adams | |
| 5,472,606 A | 12/1995 | Steere et al. | |
| 5,591,329 A | 1/1997 | Davidson | |
| 5,871,641 A | 2/1999 | Davidson | |
| 6,312,489 B1 * | 11/2001 | Ernst et al. | ................. 55/385.3 |
| 6,315,130 B1 | 11/2001 | Olsen | |
| 6,336,946 B1 * | 1/2002 | Adams et al. | .............. 55/385.3 |
| 6,375,700 B1 | 4/2002 | Jaroszczyk et al. | |
| 6,391,076 B1 | 5/2002 | Jaroszczyk et al. | |
| 6,398,836 B1 * | 6/2002 | Frankle | ....................... 55/484 |
| 6,416,561 B1 | 7/2002 | Kallsen et al. | |
| 6,478,959 B1 | 11/2002 | Morgan et al. | |
| 6,482,247 B2 | 11/2002 | Jaroszczyk et al. | |
| 6,511,599 B2 | 1/2003 | Jaroszczyk et al. | |
| 6,598,749 B2 | 7/2003 | Paul et al. | |

* cited by examiner

*Primary Examiner*—Michael A Marcheschi
*Assistant Examiner*—Karla Hawkins
(74) *Attorney, Agent, or Firm*—Andrus, Sceales, Starke & Sawall, LLP; J. Bruce Schelkopf (57) ABSTRACT

A filter is provided by pleated filter media having a plurality of pleats defined by wall segments extending axially along an axial direction along an axis and extending transversely along a transverse direction between first and second sets of pleat tips at first and second sets of axially extending bend lines. The pleated filter media spans laterally along a lateral span along a lateral direction, with the wall segments being spaced from each other by lateral gaps. The pleats have a pleat depth along the transverse direction along the wall segments between the first and second sets of pleat tips. The pleat depth varies as the pleated filter media spans laterally along the lateral direction.

9 Claims, 7 Drawing Sheets

FILTER WITH VARIABLE PLEAT DEPTH

BACKGROUND AND SUMMARY

The invention relates to filters, and more particularly to pleated filters.

The invention arose during continuing development efforts directed toward improvements, including space utilization, in pleated filter elements.

DETAILED DESCRIPTION

Figure 1:
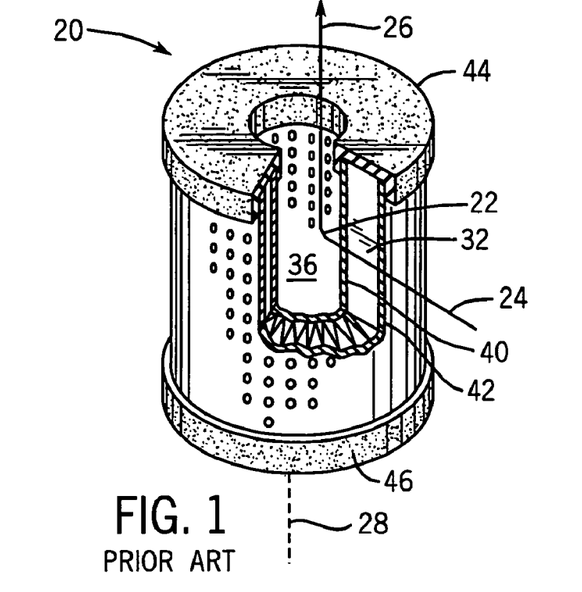
FIG. 1 is a perspective view partially cut away of a filter known in the prior art.
Figure 2:
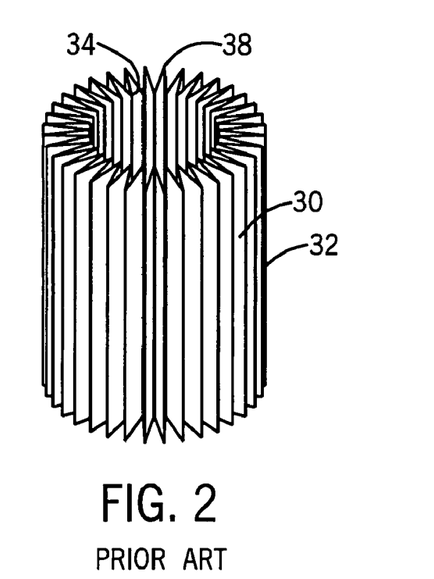
FIG. 2 is a perspective view of a portion of the assembly of FIG.
Figure 3:
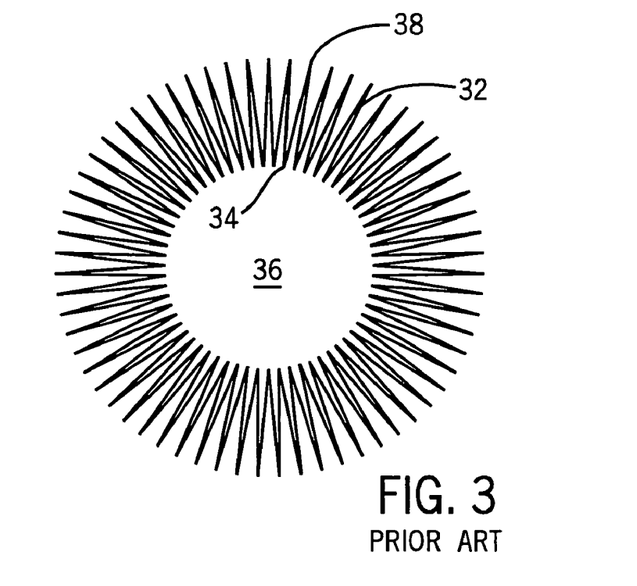
FIG. 3 is a top elevation view of the pleated filter element of FIG. 2.

FIG. 1 shows a filter 20 like that shown in U.S. Pat. No. 6,478,959, incorporated herein by reference. The filter filters fluid flowing along a flow path 22 having first and second segments, the first segment 24 being a filtering path segment, and the second segment 26 being an axial flow path segment extending axially along an axial direction along axis 28. First segment 24 is normal to second segment 26. The filter is provided by a filter media sheet 30, FIG. 2, providing an annular pleated filter element 32 extending axially along the noted axial direction, and having a plurality of inner pleat tips 34, FIGS. 2, 3, defining a hollow filter interior 36, and having a plurality of outer pleat tips 38. The filter may have inner and outer liners 40 and 42 at respective inner and outer pleat tips 34 and 38, and may have sealing end caps 44 and 46 at the axial ends of the pleats, all as is known. Fluid to be filtered may flow radially inwardly as shown at 24 through the filter element, thus providing an outside-in filter. Alternatively, the fluid may flow in the opposite direction, namely radially outwardly through the filter element, thus providing an inside-out filter, all as is known.

In other embodiments known in the prior art, the pleats are alternately sealed to each other at their upstream and downstream axial ends to provide a direct flow filter, for example as shown in U.S. Pat. Nos. 6,375,700, 6,482,247, 6,511,599, incorporated herein by reference. Fluid to be filtered flows along an axial flow path through the filter element. The alternate sealing of the upstream and downstream ends of the channels between the pleats provides a first set of flow channels open at their upstream ends and closed at their downstream ends, and a second set of flow channels closed at their upstream ends and open at their downstream ends, all as is known. In such embodiments, fluid flows axially upwardly or downwardly in FIGS. 1, 2, and ends caps 44, 46 and liners 40, 42 are omitted.

Figure 4:
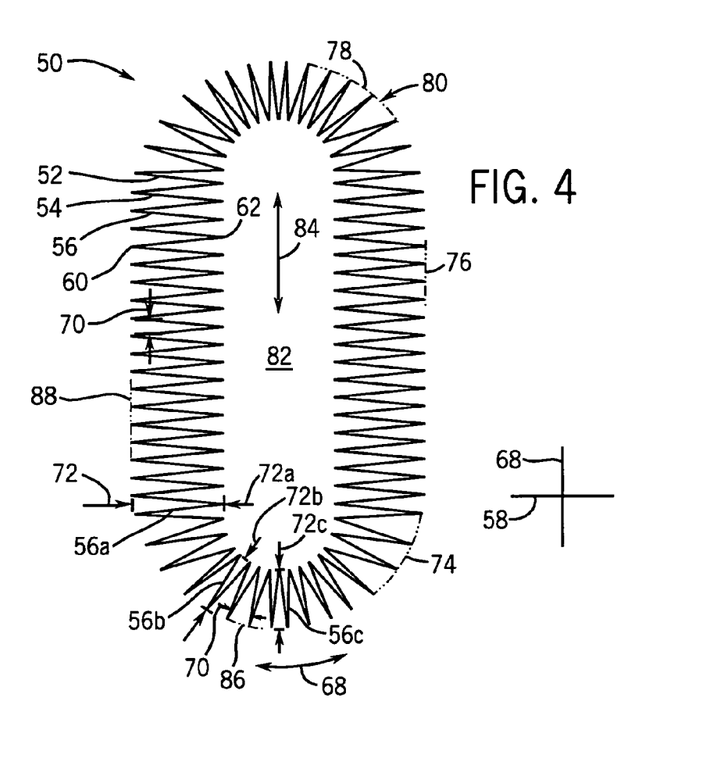
FIG. 4 is a view like FIG. 3 and illustrates the present invention.
Figure 5:
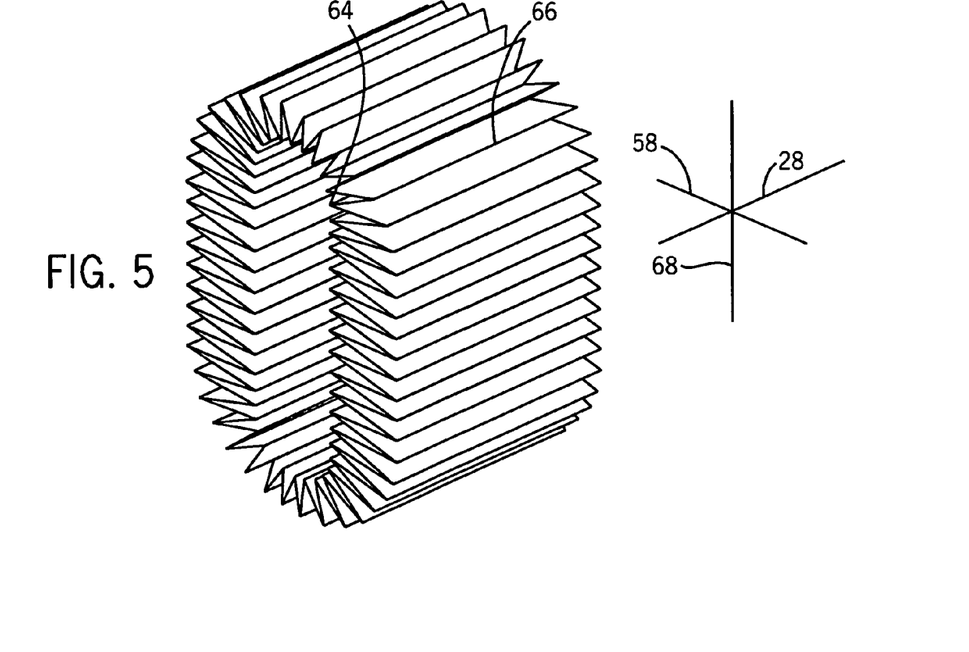
FIG. 5 is a perspective view of the filter element of FIG. 4.

FIGS. 4, 5 show a filter 50 including pleated filter media 52 having a plurality of pleats 54 defined by wall segments 56 extending axially along an axial direction along axis 28 and extending transversely along a transverse direction 58 between first and second sets of pleat tips 60 and 62 at first and second sets of axially extending bend lines 64 and 66, respectively. Transverse direction 58 is normal to axial direction 28. Pleated filter media 52 spans laterally along a lateral span along a lateral direction 68. Wall segments 56 are spaced from each other by lateral gaps 70 along lateral direction 68. Lateral direction 68 is normal to transverse direction 58 and normal to axial direction 28. Pleats 54 have a pleat depth 72 along transverse direction 58 along wall segments 56 between the first and second sets of pleat tips 60 and 62. Pleat depth 72 varies as pleated filter media 52 spans laterally along lateral direction 68, for example as shown at pleat depth 72a then shorter pleat depth 72b then shortest pleat depth 72c.

A first wall segment such as 56a, FIG. 4, has a first pleat depth such as 72a, and a second wall segment such as 56b has a second pleat depth such as 72b different than first pleat depth 72a, and a third wall segment such as 56c has a third pleat depth such as 72c different than the first and second pleat depths 72a and 72b, and so on. The different depth wall segments may be laterally adjacent each other and be separated by a single lateral gap therebetween, for example as the closed-loop shape of the filter begins to curve, for example at 74, or the different depth wall segments may be laterally spaced by a plurality of other wall segments and lateral gaps therebetween, for example comparing the wall segment depth along a straight-run of the filter as at 76 vs. the wall segment pleat depth at a curve or turn such as 78. Pleated filter media 52 spans along an annulus 80 in a plane normal to axis 28. As used herein, an annulus or annular shape includes the racetrack shape as shown and any other closed-loop shape including circular shapes, oval shapes, obround shapes, eccentric shapes, and so on. In FIGS. 4, 5, the annular shape has a first span section such as 78 and a second span section such as 76, wherein the first span section is curved and has a pleat depth less than the pleat depth at second span section 76.

In FIGS. 4, 5 annular shape 80 defines a hollow interior 82 elongated along a longitudinal direction 84 in the noted plane normal to axis 28. Annular shape 80 has two distally oppositely longitudinally spaced curved span sections 78 and 86 joined by a pair of longitudinal sections 76 and 88 extending longitudinally therebetween. The pleat depth at the two curved span sections 78, 86, e.g. pleat depth 72c, is less than the pleat depth at the pair of longitudinal sections 76, 88, e.g. pleat depth 72a.

Figures 6, 7:
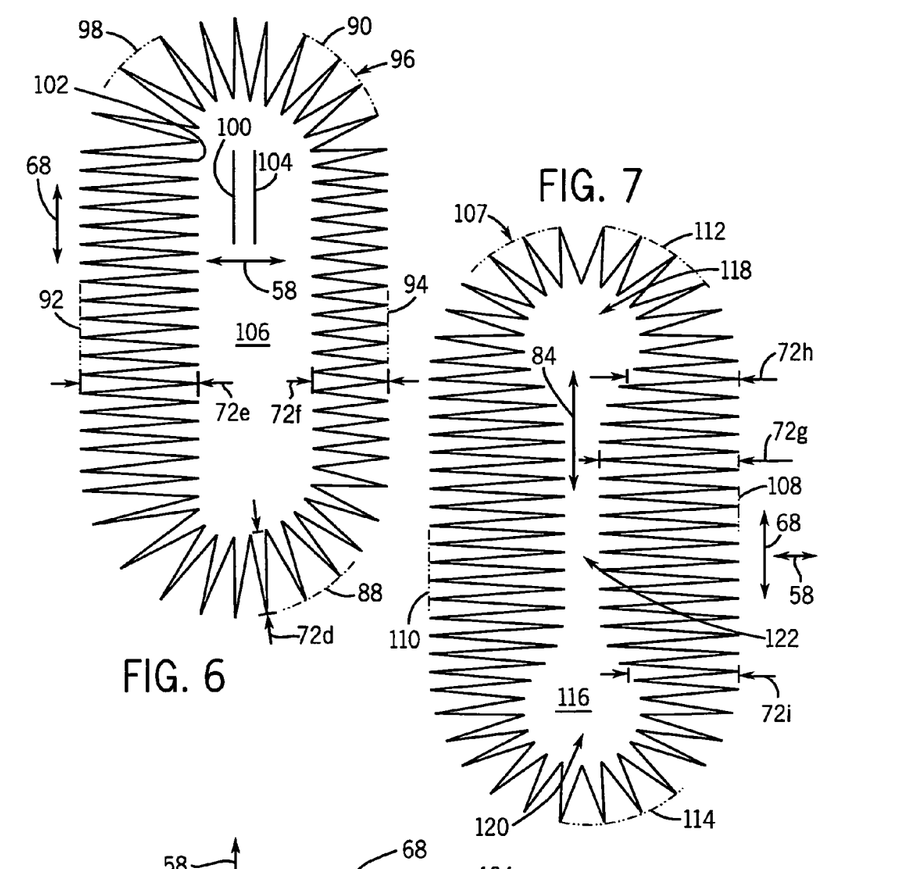
FIG. 6 is like FIG. 4 and shows another embodiment.
FIG. 7 is like FIG. 4 and shows another embodiment.

FIG. 6 shows another embodiment and uses like reference numerals from above where appropriate to facilitate understanding. In FIG. 6, pleat depth 72d at one or both curved span sections 88, 90 is less than pleat depth 72e at longitudinal section 92, and may or may not be less than pleat depth 72f at longitudinal section 94. In one embodiment, pleat depth 72e at longitudinal section 92 is greater than pleat depth 72f at longitudinal section 94, as shown. Annular shape 96 in FIG. 6 has an outer perimeter 98 having a longitudinally extending first longitudinal centerline 100 in the noted plane normal to axis 28, i.e. the plane of the page in FIG. 6. Annular shape 96 has an inner perimeter 102 having a longitudinally extending second longitudinal centerline 104 in the noted plane normal to axis 28. Inner perimeter 102 defines hollow interior 106 of the filter element. First and second longitudinal centerlines 100 and 104 are transversely offset from each other along transverse direction 58.

FIG. 7 shows another embodiment and uses like reference numerals from above where appropriate to facilitate understanding. In the annular shape 107 in FIG. 7, the pleat depth of at least one of and preferably both of longitudinal sections 108 and 110 varies as the respective longitudinal section spans laterally along lateral direction 68 and longitudinally along the noted longitudinal direction 84, for example as shown at pleat depth 72g greater than pleat depth 72h. Longitudinal section 108 has a first pleat depth 72h adjacent curved span section 112, a second pleat depth 72g intermediate the two curved span sections 112 and 114, and a third pleat depth 72i adjacent the other curved span section 114. Second pleat depth 72g is different than the first and third pleat depths 72h and 72i. In FIG. 7, second pleat depth 72g is greater than first and third pleat depths 72h and 72i. Longitudinal section 110 is comparable. Hollow interior 116 of the filter element of FIG. 7 has a barbell shape in the noted plane normal to axis 28, i.e. in the plane of the page of FIG. 7. The barbell shape has a pair of longitudinally distally oppositely spaced transverse width sections 118 and 120 at the two curved span sections 112 and 114, respectively, and has an intermediate narrower transverse width section 122 extending longitudinally therebetween.

Figure 8:
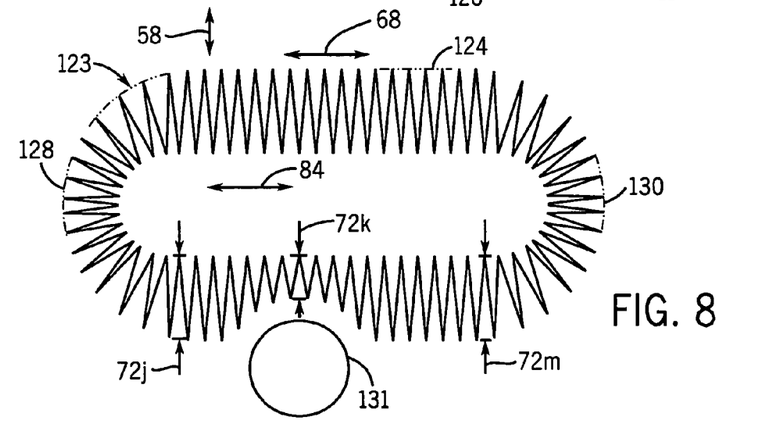
FIG. 8 is like FIG. 4 and shows another embodiment.

FIG. 8 shows another embodiment and uses like reference numerals from above where appropriate to facilitate understanding. The annular shape 123 in FIG. 8 has a pair of longitudinal sections 124 and 126 extending longitudinally between curved span sections 128 and 130. The pleat depth of longitudinal section 126 varies as such longitudinal section spans laterally along lateral direction 68 and longitudinally along longitudinal direction 84. Longitudinal section 126 has a first pleat depth 72j adjacent curved span section 128, a second pleat depth 72k intermediate the two curved span sections 128 and 130, and a third pleat depth 72m adjacent curved span section 130. Second pleat depth 72k is less than first and third pleat depths 72j and 72m.

Figure 9:
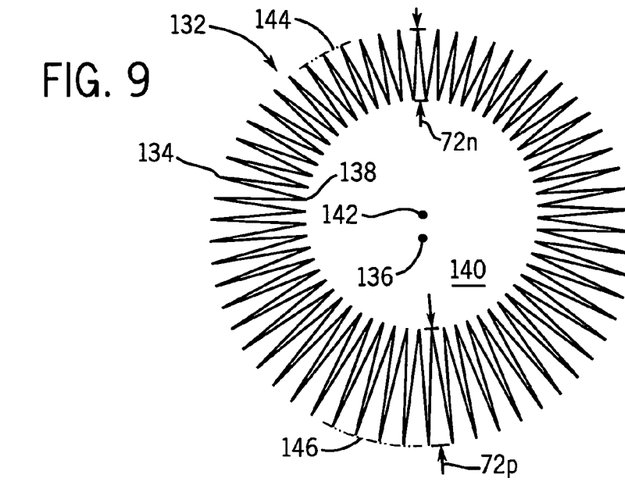
FIG. 9 is like FIG. 4 and shows another embodiment.

FIG. 9 shows another embodiment and uses like reference numerals from above where appropriate to facilitate understanding. Annular shape 132 in FIG. 9 has an outer perimeter 134 having an axially extending first axial centerline 136 extending along axis 28, i.e. into the plane of the page of FIG. 9 and perpendicular thereto. Annular shape 132 has an inner perimeter 138 defining a hollow interior 140 of the filter element and having an axially extending second axial centerline 142 extending along the noted axial direction 28. First and second axial centerlines 136 and 142 are transversely offset from each other along the noted transverse direction 58. Inner and outer perimeters 138 and 134 are eccentric relative to each other. In the embodiment of FIG. 9, each of inner and outer perimeters 138 and 134 is circular. Pleat depth 72n at curved span section 144 is less than pleat depth 72p at curved span section 146.

Figure 10:
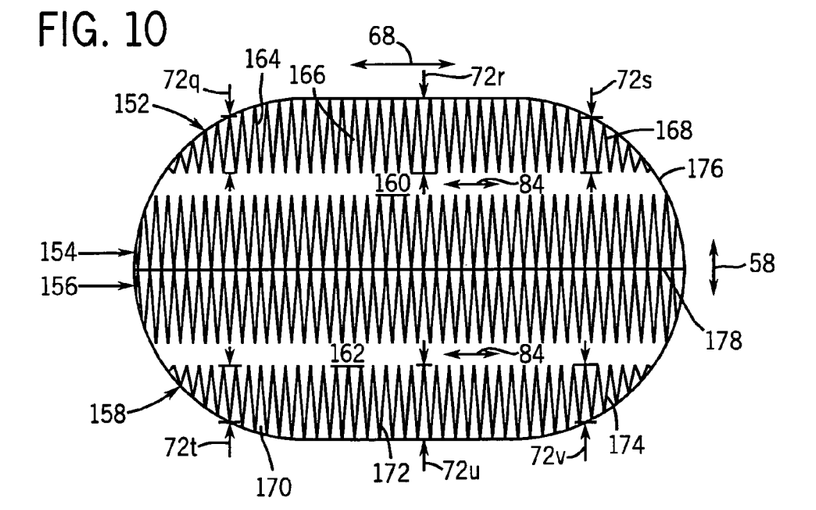
FIG. 10 is like FIG. 4 and shows another embodiment.

FIG. 10 shows another embodiment and uses like reference numerals from above where appropriate to facilitate understanding. The pleated filter media has first, second, third, and fourth panels 152, 154, 156 and 158 spanning laterally along lateral direction 68 in a plane normal to axis 28, i.e. in the plane of the page of FIG. 10, and defining first and second hollow interiors 160 and 162. Panel 152 has first, second and third span sections 164, 166 and 168, with second span section 166 being laterally between first and third span sections 164 and 168. The pleat depth 72r of second span section 166 is greater than the pleat depths 72q and 72s of first and third span sections 164 and 168. Fourth panel 158 has first, second and third span sections 170, 172 and 174, with second span section 172 being laterally between first and third span sections 170 and 174. The pleat depth 72u of second span section 172 is greater than the pleat depths 72t and 72v of first and third span sections 170 and 174. Hollow interior 160 is elongated along longitudinal direction 84 in the noted plane normal to axis 28. Panel 152 has two distally oppositely longitudinally spaced span sections 164 and 168 joined by intermediate span section 166 extending longitudinally therebetween. Hollow interior 162 is elongated along longitudinal direction 84 in the noted plane normal to axis 28. Panel 158 has two distally oppositely longitudinally spaced span sections 170 and 174 joined by intermediate span section 172 extending longitudinally therebetween. Hollow interior 160 is transversely spaced between panels 152 and 154 along the noted transverse direction 58. Hollow interior 162 is transversely spaced between panels 156 and 158 along the noted transverse direction 58. Panels 154 and 156 are transversely adjacent each other and transversely spaced between hollow interiors 160 and 162 and panels 152 and 158. Hollow interior 160 and/or 162 may be enclosed at their longitudinal ends by surrounding filter media or an enclosing housing such as 176, which may also include a wall 178 between panels 154 and 156.

Figure 11:
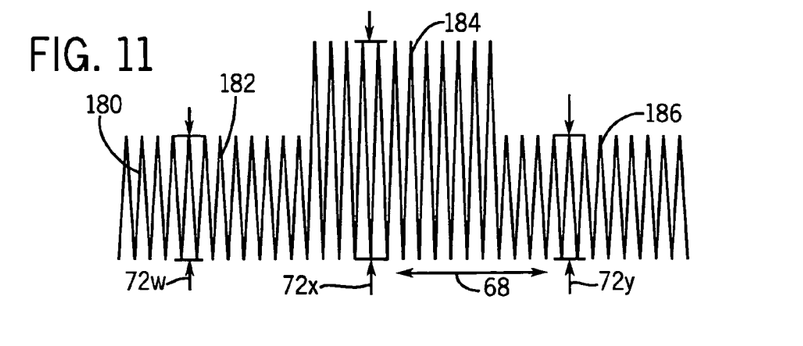
FIG. 11 is like FIG. 4 and shows another embodiment.
Figure 12:
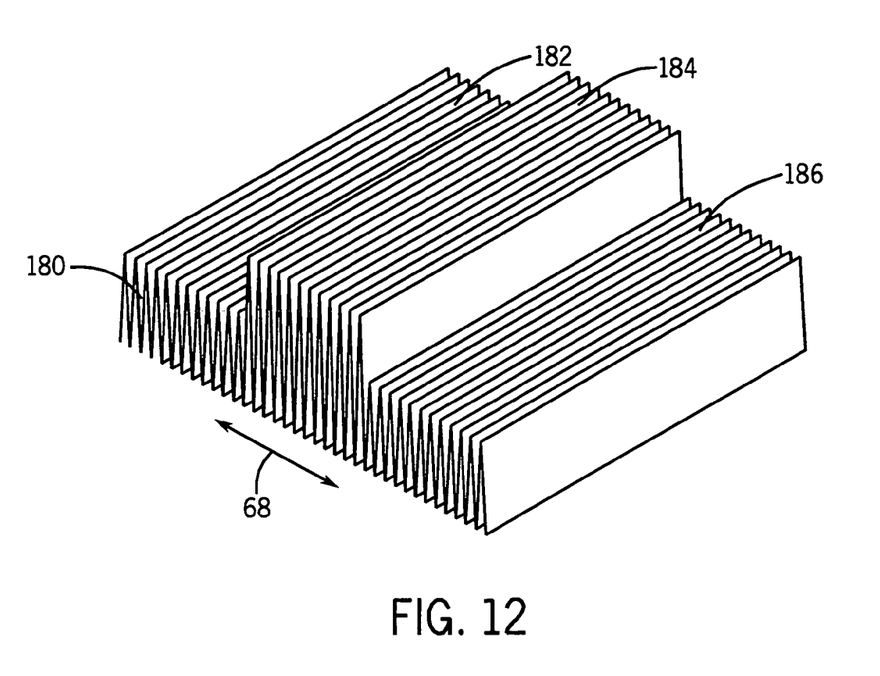
FIG. 12 is a perspective view of the filter element of FIG. 11.

FIGS. 11, 12 show another embodiment and use like reference numerals from above where appropriate to facilitate understanding. Pleated filter media 180 spans laterally along lateral direction 68 from a first span section 182 to a second span section 184 to a third span section 186. In this embodiment, the pleated filter media spans rectilinearly along first, second, third span sections 182, 184, 186, without curved or closing-loop sections as above in FIGS. 4-9. The pleat depth 72x of second span section 184 is greater than the pleat depths 72w and 72y of first and third span sections 182 and 186. In other embodiments, pleat depth 72x is less than pleat depths 72w and 72y. Pleat depths 72w and 72y may or may not be the same.

Figure 13:
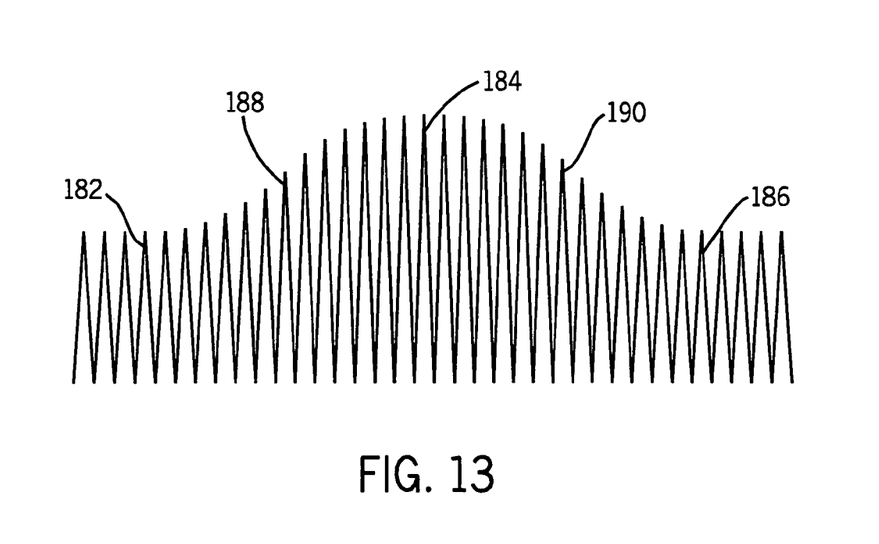
FIG. 13 is like FIG. 11 and shows another embodiment.

FIG. 13 shows another embodiment and uses like reference numerals from above where appropriate to facilitate understanding. FIG. 13 shows transition span section 188 between sections 182 and 184, and transition span section 190 between sections 184 and 186, of varying transition pleat depth.

Varying the pleat depth of filter media at strategic locations throughout the filter can be useful for increased performance, and to accommodate various space envelopes. Reducing pleat depth in the radius sections of round, oval or racetrack filters reduces restriction, increases capacity, and allows for increased media area. Conventional single depth pleating often will result in blind-off pleats in the radius sections of such filters, and thus the media in that region is not fully utilized. Variable pleat depths in panel filters enable unique designs that will fully use the space available. Changing the pleat depth will allow for media area to be maximized, and filter performance increased. Performance is increased because variable pleat depth allows for more and/or better utilization of the filter media. By reducing the pleat depth in the radius or curved span sections of filters, the inside pleat tips remain open for fluid flow, rather than blinding-off of such pleats. In the past, with conventional single depth pleating, to prevent blind-off of pleats in radius or curved or corner sections, the pleat height is reduced throughout the entire filter, to accommodate such curved sections without blinding-off same. Variable pleat height also enables increased media to be added to the straight sections of filters, as shown. In panel filter designs, FIGS. 11-13, an extended pleat depth section may be provided in the middle and/or reduced pleat depth sections on the sides, or vice versa. The added media is not possible with conventional single depth pleating. The additional media provides increased performance for panel filters. The variable depth also enables offset inlet or outlet designs, e.g. FIGS. 6, 9, for additional media. Conventional pleating would require using the reduced pleat depth throughout the filter, thus resulting in less media area. FIG. 8 shows variable pleating allowing a filter to be designed around physical obstructions, e.g. at 131. This type of design may be used on various filter shapes, and allows filter designs that are not possible with conventional single depth pleating. As noted above, the designs may be used in direct flow type filters where the pleat ends are alternately sealed and fluid flows in the noted axial direction 28 along the length of the pleat and/or along the depth of the pleat along transverse direction 58 and/or laterally through the pleat wall segment along lateral direction 68. The present designs enable the space allowed for filters and housings to be customized and not limited to current constraints. The designs further allow for different pleat depths throughout the filter as needed for performance and/or structural reasons. This variable pleating could allow for structural voids within the pleated area or other design characteristics such as offset inlets and outlets.

Figure 14:
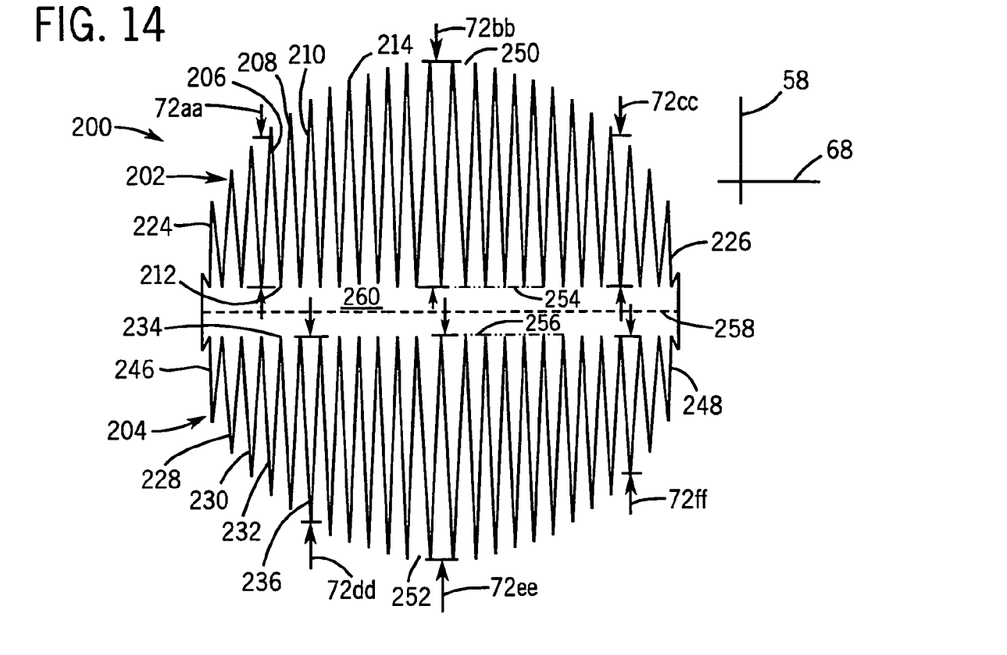
FIG. 14 is like FIG. 4 and shows another embodiment.
Figure 15:
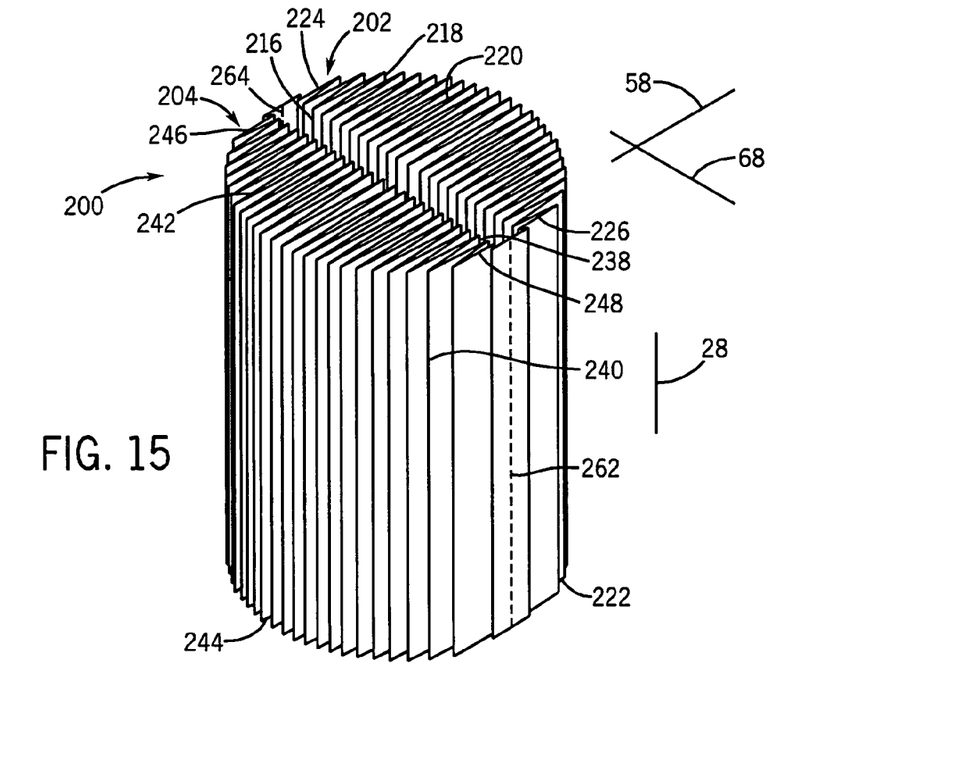
FIG. 15 is a perspective view of the filter element of FIG. 14.

FIGS. 14, 15 show another embodiment and use like reference numerals from above where appropriate to facilitate understanding. Filter element 200 includes a pair of panels 202 and 204 mating to form a closed-loop annulus. Panel 202 is a pleated filter media sheet 206 having a plurality of pleats 208 defined by wall segments 210 extending along transverse direction 58 between first and second sets of pleat tips 212 and 214 at first and second sets of axially extending bend lines 216 and 218. Wall segments 210 extend axially between first and second axial ends 220 and 222. Panel 202 spans laterally along a lateral span along lateral direction 68 from a first lateral end 224 to a second lateral end 226. Wall segments 210 have the noted pleat depth 72 along transverse direction 58 between the first and second sets of pleat tips 212 and 214. The depth of wall segments 210 varies as panel 202 spans laterally along its lateral span along lateral direction 68 from first lateral end 224 to second lateral end 226, i.e. left to right in FIG. 14, for example as shown at pleat depth 72*aa* increasing to pleat depth 72*bb* then decreasing to pleat depth 72*cc*.

Second panel 204 is provided by a second pleated filter media sheet 228 having a plurality of pleats 230 defined by wall segments 232 extending along the noted transverse direction 58 between third and fourth sets of pleat tips 234 and 236 at third and fourth sets of axially extending bend lines 238 and 240. Wall segments 232 of second panel 204 extend axially between third and fourth axial ends 242 and 244. Second panel 204 spans laterally along a lateral span along the noted lateral direction 68 from a third lateral end 246 to a fourth lateral end 248. Wall segments 232 of panel 204 have pleat depth 72 along the noted transverse direction 58 between the third and fourth sets of pleat tips 234 and 236. The pleat depth of wall segments 232 of panel 204 varies as panel 204 spans laterally along lateral direction 68 from third lateral end 246 to fourth lateral end 248, as shown at pleat depth 72*dd* increasing to pleat depth 72*ee* then decreasing to pleat depth 72*ff*.

The pleat depth of wall segments 210 along transverse direction 58 of first panel 202 varies as panel 202 spans laterally along lateral direction 68 from first lateral end 224 to second lateral end 226 such that wall segments 210 have a minimum pleat depth such as 72*aa* at first lateral end 224, then increase to a maximum pleat depth such as 72*bb* at a central region 250 between first and second lateral ends 224 and 226, then decrease to a minimum pleat depth 72*cc* at second lateral end 226. The pleat depth of wall segments 232 along transverse direction 58 of second panel 204 varies as panel 204 spans laterally along lateral direction 68 from third lateral end 246 to fourth lateral end 248 such that wall segments 232 of second panel 204 have a minimum pleat depth such as 72*dd* at third lateral end 246, then increase to a maximum pleat depth such as 72*ee* at a central region 252 between third and fourth lateral ends 246 and 248, then decrease to a minimum pleat depth such as 72*ff* at fourth lateral end 248.

Minimum pleat depth wall segments 210 at first and second laterals ends 224 and 226 of first panel 202 are distally opposite each other along a first chord, for example as shown in dashed line at 254, extending along the noted lateral direction 68 through the annular filter element. Minimum pleat depth wall segments 232 at third and fourth lateral ends 246 and 248 of second panel 204 are distally opposite each other along a second chord, for example as shown at dashed line 256, extending along the noted lateral direction 68 through the annular filter element. Chords 254 and 256 are preferably parallel to each other. First chord 254 preferably extends parallel to a projection line, for example as shown in dashed line at 258, extending laterally along lateral direction 68 through the axial centerline of the annular filter element. Second chord 256 extends parallel to projection line 258 and on the opposite transverse side thereof from first chord 254. Chords 254 and 256 are spaced by a transverse gap 260 therebetween. The noted axial flow path segment 26 extends axially through gap 260, i.e. out of the page in FIG. 14. Minimum pleat depth wall segments 210 at first lateral end 224 of first panel 202 are diametrically opposite minimum pleat depth wall segments 232 at fourth lateral end 248 of second panel 204. Minimum pleat depth wall segments 210 at second lateral end 226 of first panel 202 are diametrically opposite minimum pleat depth wall segments 232 at third lateral end 246 of second panel 204. In the preferred embodiment of FIGS. 14, 15, the annular filter element is cylindrical, though other annular configurations may be used, such as oval shaped, racetrack shaped, obround shaped, and other closed-loop shapes. In preferred form, the first set of pleat tips 212 lie along a first rectilinear projection line 254 extending along lateral direction 68, and the third set of pleat tips 234 lie along a second rectilinear projection line 256 extending along lateral direction 68 and transversely spaced from first rectilinear projection line 254. The first and second panels 202 and 204 are sealed together along axial sealing strips such as shown in dashed line at 262 and 264. The filter element may have inner and outer liners and sealing axial end caps, as above. The fluid flow direction may be outside-in, as shown in FIG. 1, or inside-out which is the reverse of that shown in FIG. 1. Further alternatively, a direct flow filter may be provided wherein the fluid flows axially through the filter, wherein the channels between the pleated wall segments are alternately sealed to each other at the upstream and downstream axial ends to provide a first set of flow channels open at their upstream ends and closed at their downstream ends, and a second set of flow channels closed at their upstream ends and open at their downstream ends, as above noted.

A filter of the above noted geometry, including outside-in flow and inside-out flow, may have ends that are sealed by a formed or molded end cap that may communicate flow from the interior of the annular shape to an inlet or outlet. Typically, one end is completely sealed, e.g. the bottom end in FIGS. 1, 17; and the opposite axial end, e.g. the upper end in FIGS. 1, 17, has a shape or seal defined by its mating surface to a filter head or plenum. This may be useful if the filter is housed in a can and needs to attach or seal to a nut plate or filter head. Because the geometry lends itself to placing each filter half 202 and 204 in a mold or tool, such semi-circular shape or other arcuate portion of a closed-loop annulus, lends itself to injection molding. Each semi-circular or arcuate shaped half may have a formed frame that when joined around the perimeter forms a sealed unit. Additionally, these two halves may be identical or mirror images of each other with details that allow them to seal or snap together. The axial ends may be closed or open to communicate flow from the interior of the annular element to an inlet or outlet plenum or mating surface. An advantage of the pleated configuration is the ability to place the pleated section in a molding tool and form the frame or support around it, which may otherwise be difficult with radial pleats. Additionally, the two halves may be formed simultaneously where the middle of the form becomes a hinge, e.g. at the location of line 262, and the outer edges seal to become a complete unit. A support grid or structure or liner may be provided within the rectangular annulus 260 of the filter to provide resistance to differential pressure, and stabilize the pleat structure.

Figure 16:
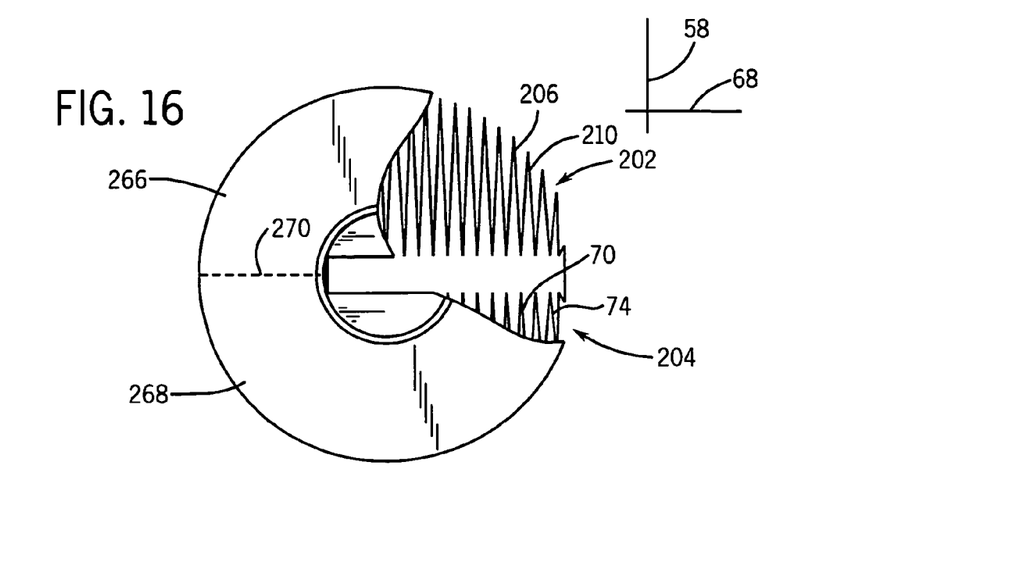
FIG. 16 is like FIG. 14 and shows a further embodiment.
Figure 17:
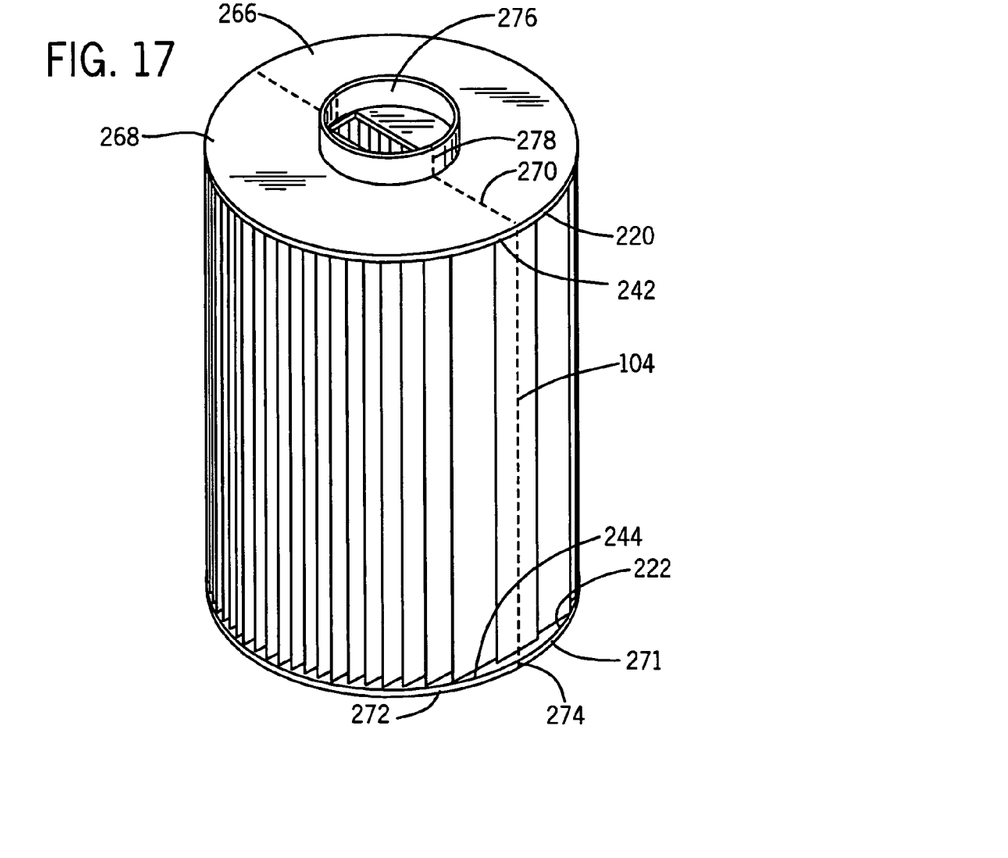
FIG. 17 is a perspective view of the assembly of FIG. 16.

FIGS. 16, 17 show a first end cap 266 mounted to first pleated media sheet 206 of first panel 202 at first axial end 220 of wall segments 210 of first pleated filter media sheet 206. A second end cap 268 is mounted to second pleated filter media sheet 228 of second panel 204 at third axial end 242 of wall segments 232 of second pleated filter media sheet 228. First and second end caps 266 and 268 are mated and sealed to each other, e.g. as shown along dashed line 270, and span laterally along the noted lateral direction 68 and transversely along the noted transverse direction 58. Each end cap is initially mounted and sealed to its respective filter media sheet of its respective panel, and then these subassemblies are mounted to each other, with end caps 266, 268 in the noted mated sealed relation.

A third end cap 271, FIG. 17, is mounted to first pleated media filter sheet 206 of first panel 202 at second axial end 222 of wall segments 210 of first pleated filter media sheet 206. A fourth end cap 272 is mounted to second pleated filter media sheet 228 of second panel 204 at fourth axial end 244 of wall segments 232 of second pleated filter media sheet 228. Third and fourth end caps 271 and 272 are mated and sealed to each other at 274 and span laterally along lateral direction 68 and transversely along transverse direction 58. In the embodiment of FIG. 17, the subassembly of mated end caps 271 and 272 form a closed end cap comparable to end cap 46 of FIG. 1. The subassembly of mated end caps 266 and 268 form an end cap comparable to end cap 44 of FIG. 1, with an opening or port 276 therethrough communicating with the interior of the filter element. Mated first and second end caps 266 and 268 are axially distally oppositely spaced from mated third and fourth end caps 270 and 272 along axial direction 28. Mated end caps 266 and 268 have a central interface portion 278 with opening 276 extending axially therethrough providing a port communicating the noted axial flow path segment 26 therethrough, FIG. 1. Each of end caps 266 and 268 is an arcuate portion of a closed-loop annulus. Preferably end caps 266 and 268 are identical, for cost reduction. Likewise, end caps 270 and 272 are preferably identical. Further preferably, each of the noted end caps is semi-circular.

It is recognized that various equivalents, alternatives and modifications are possible within the scope of the appended claims.

What is claimed is:

1. A filter comprising pleated filter media having a plurality of pleats defined by wall segments extending axially along an axial direction along an axis and extending transversely along a transverse direction between first and second sets of pleat tips at first and second sets of axially extending bend lines, said transverse direction being normal to said axial direction, said pleated filter media spanning laterally along a lateral span along a lateral direction, with said wall segments being spaced from each other by lateral gaps along said lateral direction, said lateral direction being normal to said transverse direction and normal to said axial direction, said pleats having a pleat depth along said transverse direction along said wall segments between said first and second sets of pleat tips, said pleat depth varying as said pleated filter media spans laterally along said lateral direction, wherein said pleated filter media spans along an annular shape in a plane normal to said axis, said annular shape having at least first and second span sections, at least said first span section being curved, said pleat depth at said first span section being less than said pleat depth at said second span section, wherein said annular shape defines a hollow interior elongated alone a longitudinal direction in said plane normal to said axis, said annular shape comprising two distally oppositely longitudinally spaced curved span sections joined by a pair of longitudinal sections extending longitudinally therebetween, said pleat depth at said two curved span sections being less than said pleat depth at at least one of said pair of longitudinal sections, wherein said pleat depth at said two curved span sections is less than said pleat depth at both of said pair of longitudinal sections.

2. A filter comprising pleated filter media having a plurality of pleats defined by wall segments extending axially along an axial direction along an axis and extending transversely along a transverse direction between first and second sets of pleat tips at first and second sets of axially extending bend lines, said transverse direction being normal to said axial direction, said pleated filter media spanning laterally along a lateral span along a lateral direction, with said wall segments being spaced from each other by lateral gaps along said lateral direction, said lateral direction being normal to said transverse direction and normal to said axial direction, said pleats having a pleat depth along said transverse direction along said wall segments between said first and second sets of pleat tips, said pleat depth varying as said pleated filter media spans laterally alone said lateral direction, wherein said pleated filter media spans along an annular shape in a plane normal to said axis, said annular shape having at least first and second span sections. at least said first span section being curved, said pleat depth at said first span section being less than said pleat depth at said second span section, wherein said annular shape defines a hollow interior elongated along a longitudinal direction in said plane normal to said axis, said annular shape comprising two distally oppositely longitudinally spaced curved span sections joined by a pair of longitudinal sections extending longitudinally therebetween, said pleat depth at said two curved span sections being less than said pleat depth at at least one of said pair of longitudinal sections, wherein said pleat depth at one of said pair of longitudinal sections is greater than said pleat depth at the other of said pair of longitudinal sections.

3. A filter comprising pleated filter media having a plurality of pleats defined by wall segments extending axially along an axial direction along an axis and extending transversely along a transverse direction between first and second sets of pleat tips at first and second sets of axially extending bend lines, said transverse direction being normal to said axial direction, said pleated filter media spanning laterally along a lateral span along a lateral direction, with said wall segments being spaced from each other by lateral gaps along said lateral direction, said lateral direction being normal to said transverse direction and normal to said axial direction, said pleats having a pleat depth along said transverse direction along said wall segments between said first and second sets of pleat tips, said pleat depth varying as said pleated filter media spans laterally along said lateral direction, wherein said pleated filter media spans along an annular shape in a plane normal to said axis, said annular shape having at least first and second span sections, at least said first span section being curved, said pleat depth at said first span section being less than said pleat depth at said second span section. wherein said annular shape defines a hollow interior elongated along a longitudinal direction in said plane normal to said axis, said annular shape comprising two distally oppositely longitudinally spaced curved span sections joined by a pair of longitudinal sections extending longitudinally therebetween, said pleat depth at said two curved span sections being less than said pleat depth at at least one of said pair of longitudinal sections, wherein said annular shape has an outer perimeter having a longitudinally extending first longitudinal centerline in said plane normal to said axis, said annular shape has an inner perimeter having a longitudinally extending second longitudinal centerline in said plane normal to said axis, said inner perimeter defining said hollow interior, said first and second longitudinal centerlines being transversely offset from each other along said transverse direction.

4. A filter comprising pleated filter media having a plurality of pleats defined by wall segments extending axially along an axial direction along an axis and extending transversely along a transverse direction between first and second sets of pleat tips at first and second sets of axially extending bend lines, said transverse direction being normal to said axial direction, said pleated filter media spanning laterally along a lateral span along a lateral direction, with said wall segments being spaced from each other by lateral gaps along said lateral direction, said lateral direction being normal to said transverse direction and normal to said axial direction, said pleats having a pleat depth along said transverse direction along said wall segments between said first and second sets of pleat tips, said pleat depth varying as said pleated filter media spans laterally along said lateral direction, wherein said pleated filter media spans alone an annular shape in a plane normal to said axis, said annular shape having at least first and second span sections, at least said first span section being curved, said pleat depth at said first span section being less than said pleat depth at said second span section, wherein said annular shape defines a hollow interior elongated along a longitudinal direction in said plane normal to said axis, said annular shape comprising two distally oppositely longitudinally spaced curved span sections joined by a pair of longitudinal sections extending longitudinally therebetween, said pleat depth at said two curved span sections being less than said pleat depth at at least one of said pair of longitudinal sections, wherein said pleat depth of at least one of said pair of longitudinal sections varies as said one of said pair of longitudinal sections spans laterally along said lateral direction and longitudinally along said longitudinal direction, wherein said pleat depth of both of said pair of longitudinal sections varies as each of said pair of longitudinal sections spans laterally along said lateral direction and longitudinally along said longitudinal direction, wherein said hollow interior has a barbell shape in said plane normal to said axis, said barbell shape having a pair of longitudinally distally oppositely spaced transverse width sections at said two curved span sections, respectively, and an intermediate narrower transverse width section extending longitudinally therebetween.

5. A filter comprising pleated filter media having a plurality of pleats defined by wall segments extending axially along an axial direction along an axis and extending transversely along a transverse direction between first and second sets of pleat tips at first and second sets of axially extending bend lines, said transverse direction being normal to said axial direction, said pleated filter media spanning laterally along a lateral span along a lateral direction, with said wall segments being spaced from each other by lateral gaps along said lateral direction, said lateral direction being normal to said transverse direction and normal to said axial direction, said pleats having a pleat depth along said transverse direction along said wall segments between said first and second sets of pleat tips, said pleat depth varying as said pleated filter media spans laterally along said lateral direction, wherein said pleated filter media spans along an annular shape in a plane normal to said axis, said annular shape having at least first and second span sections, at least said first span section being curved, said pleat depth at said first span section being less than said pleat depth at said second span section, wherein said annular shape has an outer perimeter having an axially extending first axial centerline, said annular shape has an inner perimeter defining a hollow interior and having an axially extending second axial centerline, said first and second axial centerlines being transversely offset from each along said transverse direction.

6. The filter according to claim 5 wherein said inner and outer perimeters are eccentric relative to each other.

7. The filter according to claim 6 wherein each of said inner and outer perimeters is circular.

8. A filter comprising pleated filter media having a plurality of pleats defined by wall segments extending axially along an axial direction along an axis and extending transversely along a transverse direction between first and second sets of pleat tips at first and second sets of axially extending bend lines, said transverse direction being normal to said axial direction, said pleated filter media spanning laterally along a lateral span along a lateral direction, with said wall segments being spaced from each other by lateral gaps along said lateral direction, said lateral direction being normal to said transverse direction and normal to said axial direction, said pleats having a pleat depth along said transverse direction along said wall segments between said first and second sets of pleat tips, said pleat depth varying as said pleated filter media spans laterally along said lateral direction, wherein said pleated filter media has at least first and second panels spanning laterally in a plane normal to said axis and defining at least a first hollow interior, at least said first panel having first and second span sections of different pleat depth, wherein said hollow interior is elongated along a longitudinal direction in said plane normal to said axis, and said first panel comprises two distally oppositely longitudinally spaced span sections joined by an intermediate span section extending longitudinally therebetween, said pleat depth at said intermediate span section being greater than said pleat depth at said two distally oppositely longitudinally spaced span sections.

9. A filter comprising pleated filter media having a plurality of pleats defined by wall segments extending axially along an axial direction along an axis and extending transversely along a transverse direction between first and second sets of pleat tips at first and second sets of axially extending bend lines, said transverse direction being normal to said axial direction, said pleated filter media spanning laterally along a lateral span along a lateral direction, with said wall segments being spaced from each other by lateral gaps along said lateral direction, said lateral direction being normal to said transverse direction and normal to said axial direction, said pleats having a pleat depth along said transverse direction along said wall segments between said first and second sets of pleat tips, said pleat depth varying as said pleated filter media spans laterally alone said lateral direction, wherein said pleated filter media comprises first, second, third and fourth panels spanning laterally in a plane normal to said axis and defining first and second hollow interiors, said first panel having first and second span sections of different pleat depth, said fourth panel having first and second span sections of different pleat depth, wherein said first panel has first, second and third span sections, said second span section of said first panel being laterally between said first and third span sections of said first panel, said second span section of said first panel having a pleat depth greater than said first and third span sections of said first panel, said fourth panel has first, second and third span sections, said second span section of said fourth panel being laterally between said first and third span sections of said fourth panel, said second span section of said fourth panel having a pleat depth greater than said first and third span sections of said fourth panel, and wherein said first hollow interior is elongated along a longitudinal direction in said plane normal to said axis, said first and third span sections of said first panel are distally oppositely longitudinally spaced and joined by said second span section of said first panel extending longitudinally therebetween, said second hollow interior is elongated along said longitudinal direction in said plane normal to said axis, and said first and third span sections of said fourth panel are distally oppositely longitudinally spaced and joined by said second span section of said fourth panel extending longitudinally therebetween.

* * * * *

UNITED STATES PATENT AND TRADEMARK OFFICE
CERTIFICATE OF CORRECTION

PATENT NO.      : 7,648,546 B2                                            Page 1 of 1
APPLICATION NO. : 11/327613
DATED           : January 19, 2010
INVENTOR(S)     : Haberkamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this

Twenty-third Day of November, 2010

David J. Kappos
*Director of the United States Patent and Trademark Office*